(12) United States Patent
Sano

(10) Patent No.: US 12,118,167 B2
(45) Date of Patent: Oct. 15, 2024

(54) TOUCH PANEL

(71) Applicant: Japan Display Inc., Tokyo (JP)

(72) Inventor: Takumi Sano, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/349,979

(22) Filed: Jul. 11, 2023

(65) Prior Publication Data
US 2024/0019966 A1  Jan. 18, 2024

(30) Foreign Application Priority Data

Jul. 12, 2022 (JP) .................................. 2022-111991

(51) Int. Cl.
*G06F 3/044* (2006.01)
*G06F 3/041* (2006.01)

(52) U.S. Cl.
CPC ............ *G06F 3/044* (2013.01); *G06F 3/0443* (2019.05); *G06F 3/04164* (2019.05); *G06F 3/04166* (2019.05); *G06F 2203/04102* (2013.01); *G06F 2203/04108* (2013.01)

(58) Field of Classification Search
CPC .... G06F 3/044; G06F 3/0443; G06F 3/04164; G06F 3/04166; G06F 2203/04102; G06F 2203/04108; G06F 3/041; G06F 3/0445; G06F 3/0446
See application file for complete search history.

(56) References Cited

U.S. PATENT DOCUMENTS

| | | | |
|---|---|---|---|
| 11,621,399 B2 | 4/2023 | Sano | |
| 2017/0357345 A1* | 12/2017 | Ikeda | G06F 3/0412 |
| 2019/0107911 A1* | 4/2019 | Zhai | H10K 59/40 |
| 2019/0302936 A1* | 10/2019 | Clark | G06F 3/0412 |

FOREIGN PATENT DOCUMENTS

JP  2021-118273 A  8/2021

* cited by examiner

*Primary Examiner* — Grant Sitta
(74) *Attorney, Agent, or Firm* — XSENSUS LLP

(57) ABSTRACT

According to an aspect, a touch panel includes, in sequence: a stretchable array substrate, a touch detection electrode; and a resin plate. The resin plate has: a facing surface facing the touch detection electrode; and a detection surface facing opposite to the facing surface. The facing surface or the detection surface has a recessed surface. The recessed surface is provided with a high permittivity layer having permittivity higher than permittivity of the resin plate. The touch detection electrode and the high permittivity layer overlap when viewed in a stacking direction in which the stretchable array substrate, the touch detection electrode, and the resin plate are stacked.

4 Claims, 8 Drawing Sheets

TOUCH PANEL

CROSS-REFERENCE TO RELATED APPLICATION

This application claims the benefit of priority from Japanese Patent Application No. 2022-111991 filed on Jul. 12, 2022, the entire contents of which are incorporated herein by reference.

BACKGROUND

1. Technical Field

What is disclosed herein relates to a touch panel.

2. Description of the Related Art

The stretchable array substrate described in Japanese Patent Application Laid-open Publication No. 2021-118273 has excellent flexibility and elasticity. Examples of devices provided with such a stretchable array substrate include, but are not limited to, touch panels that can detect proximity and/or contact of a finger or the like. The detection surface of such a touch panel is composed of a resin plate with excellent elasticity.

The resin plate serves as a dielectric disposed between the detection electrode and the finger in the touch panel. A dielectric with high permittivity is preferably used because it increases the capacitance between the detection electrode and the finger, thereby improving the detection sensitivity. The relative permittivity of resin material, however, is not high. Therefore, it is desired to improve the detection sensitivity.

For the foregoing reasons, there is a need for a touch panel with improved detection sensitivity.

SUMMARY

According to an aspect, a touch panel includes, in sequence: a stretchable array substrate, a touch detection electrode; and a resin plate. The resin plate has: a facing surface facing the touch detection electrode; and a detection surface facing opposite to the facing surface. The facing surface or the detection surface has a recessed surface. The recessed surface is provided with a high permittivity layer having permittivity higher than permittivity of the resin plate. The touch detection electrode and the high permittivity layer overlap when viewed in a stacking direction in which the stretchable array substrate, the touch detection electrode, and the resin plate are stacked.

DETAILED DESCRIPTION

Figure 1:
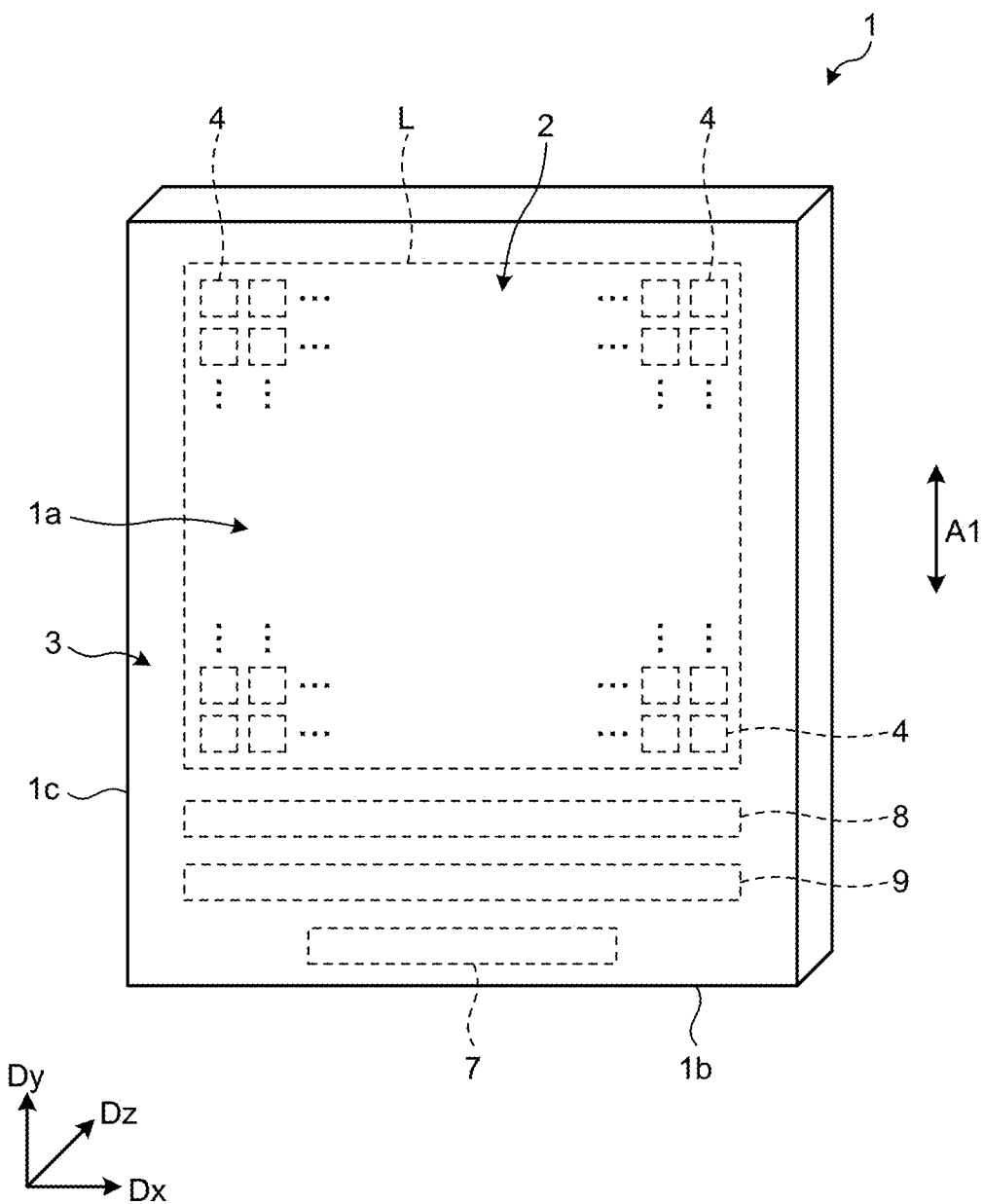
FIG. 1 is a schematic of a touch panel according to a first embodiment viewed from a detection surface.

Exemplary aspects (embodiments) to embody the present disclosure are described below in greater detail with reference to the accompanying drawings. The contents described in the embodiment below are not intended to limit the invention according to the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the drawings, components similar to those previously described with reference to previous drawings are denoted by the same reference numerals, and detailed explanation thereof may be appropriately omitted.

When the term "on" is used to describe an aspect where a first structure is disposed on/above a second structure in the present specification and the claims, it includes both of the following cases unless otherwise noted: a case where the first structure is disposed on and in contact with the second structure, and a case where the first structure is disposed above the second structure with still another structure interposed therebetween.

First Embodiment

FIG. 1 is a schematic of a touch panel according to a first embodiment viewed from a detection surface. As illustrated in FIG. 1, a touch panel 1 has a plate shape. One surface of the touch panel 1 serves as a detection surface 1a that detects a touch operation. The touch operation herein means "proximity to or contact with the detection surface 1a by an object". The touch panel 1 has a quadrilateral (rectangular) shape when viewed in the normal direction of the detection surface 1a.

The detection surface 1a of the touch panel 1 is divided into a detection region 2 and a peripheral region 3. The detection region 2 is a region in which a touch operation can be detected. The peripheral region 3 is a frame-like region surrounding the outer periphery of the detection region 2. In FIG. 1, a boundary line L is illustrated to make the boundary between the detection region 2 and the peripheral region 3 easy to understand. The detection region 2 is divided into a plurality of individual detection regions 4. In other words, the detection region 2 is composed of a plurality of individual detection regions 4. It is detected whether a touch operation is performed in each of the individual detection regions 4.

The individual detection regions 4 are arrayed in a first direction Dx and a second direction Dy. The first direction Dx is a direction parallel to the detection surface 1a. The second direction Dy is a direction parallel to the detection surface 1a and intersecting the first direction Dx. The first direction Dx according to the present embodiment is a direction parallel to a short side 1b of the touch panel 1. The second direction Dy is a direction parallel to a long side 1c of the touch panel 1. In other words, the first direction Dx and the second direction Dy according to the present embodiment are orthogonal to each other. The normal direction (stacking direction) of the detection surface 1a is referred to as a third direction Dz.

Figure 7:
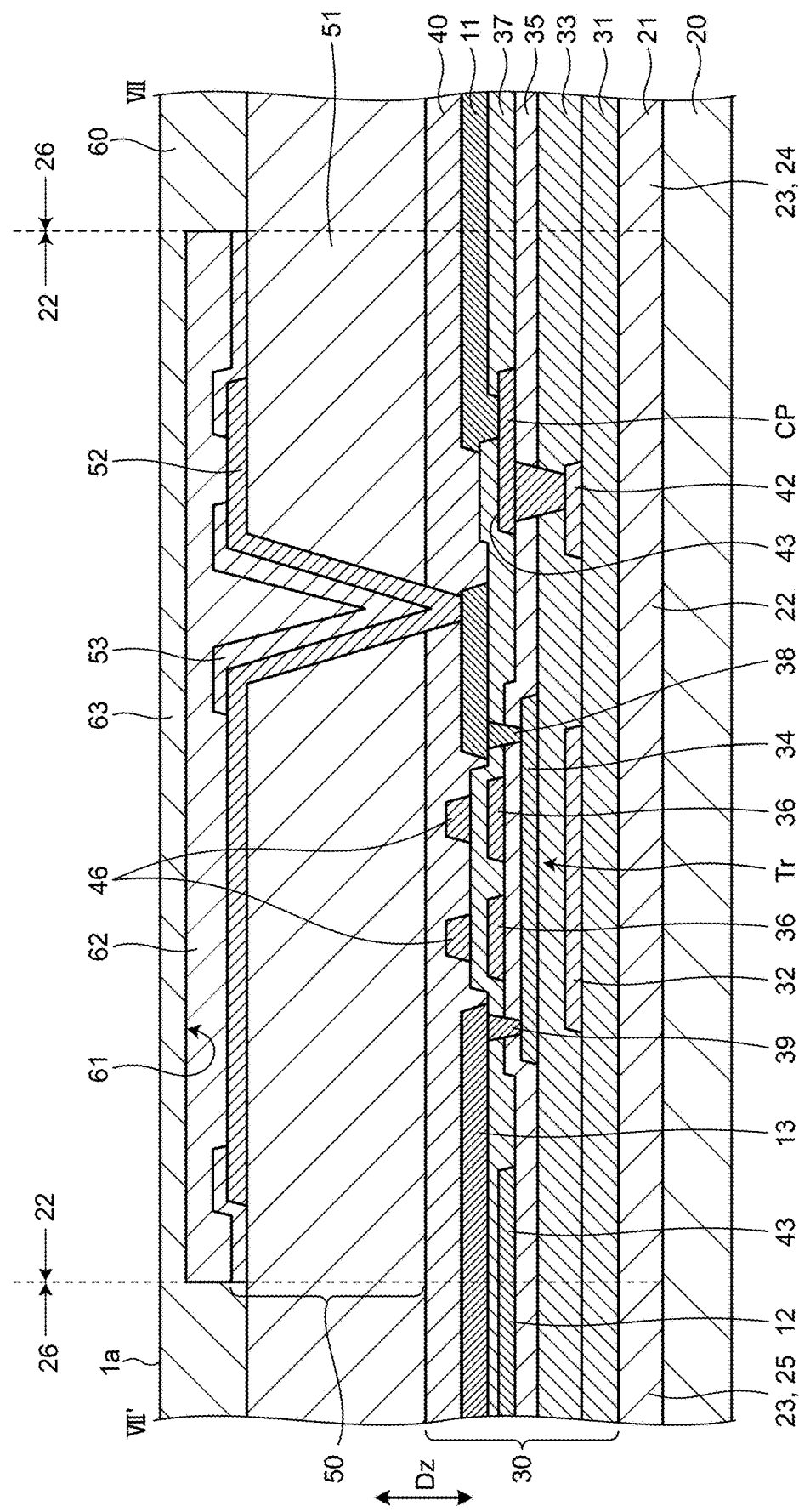
FIG. 7 is a sectional view of a body according to the first embodiment cut in a stacking direction.

Each individual detection region 4 is provided with a detection electrode 52 (refer to FIGS. 4 and 7, and other figures) and a switching element Tr (refer to FIG. 7). In the individual detection region 4, it is detected, by a self-capacitance system using the detection electrode 52, whether a touch operation is performed. The following describes the basic principle of self-capacitance touch detection.

Figure 2:
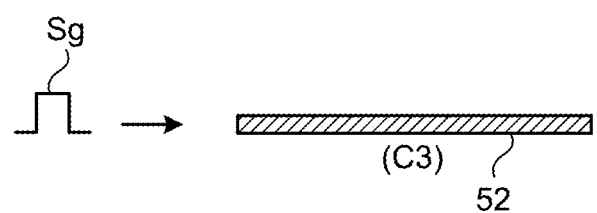
FIG. 2 is a schematic of a state where a finger is neither in contact with nor in proximity to a detection electrode in a self-capacitance system.
Figure 3:
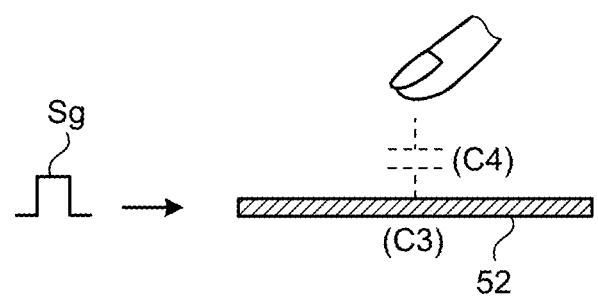
FIG. 3 is a schematic of a state where a finger is in contact with or in proximity to the detection electrode in the self-capacitance system.

FIG. 2 is a schematic of a state where a finger is neither in contact with nor in proximity to a detection electrode in the self-capacitance system. FIG. 3 is a schematic of a state where a finger is in contact with or in proximity to the detection electrode in the self-capacitance system. As illustrated in FIG. 2, an alternating-current (AC) square wave Sg at a predetermined frequency (e.g., a frequency of the order of several kilohertz to several hundred kilohertz) is applied to the detection electrode 52 when a finger is neither in contact with nor in proximity to the detection electrode 52. In this state, the detection electrode 52 has predetermined capacitance C3 and outputs an electric current corresponding to the capacitance C3.

As illustrated in FIG. 3, when a finger is in contact with or in proximity to the detection electrode 52, capacitance C4 between the finger and the detection electrode 52 is added to the capacitance C3 of the detection electrode 52. Therefore, when the AC square wave Sg is applied to the detection electrode 52, the detection electrode 52 has capacitance obtained by adding the capacitance C3 and the capacitance C4 and outputs an electric current corresponding to the capacitance. Thus, the electric current fluctuates between when a touch operation is performed and when no touch operation is performed. It is determined whether a touch operation is performed on the detection electrode 52 by detecting the fluctuation of the electric current.

Figure 4:
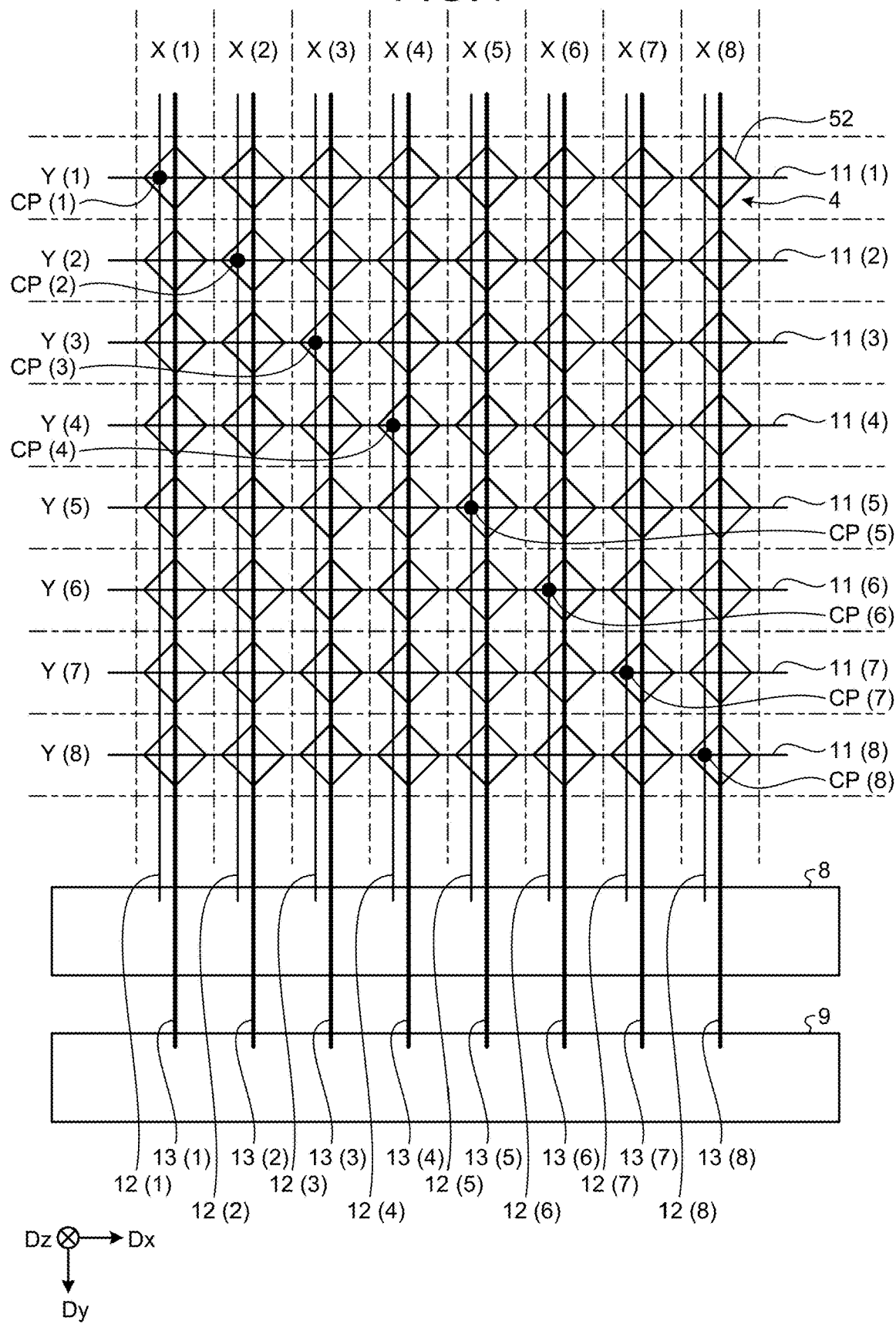
FIG. 4 is a schematic of the relation between the coordinates of a plurality of individual detection regions, gate lines, gate link lines, and signal lines.

FIG. 4 is a schematic of the relation between the coordinates of the individual detection regions, gate lines, gate link lines, and signal lines. The following describes the configuration for driving the switching element Tr (refer to FIG. 7). As illustrated in FIG. 4, the touch panel 1 includes gate lines 11, gate link lines 12, signal lines 13, a coupler 7 (refer to FIG. 1), a gate line drive circuit 8, and a signal line selection circuit 9 to drive the switching elements Tr. The source (source metal 38) of the switching element Tr is coupled to the detection electrode 52 (refer to FIG. 7).

In FIG. 4, 8×8 individual detection regions 4 are extracted from the individual detection regions 4. The X-coordinates of the 8×8 individual detection regions 4 are denoted by X(1), X(2), . . . , and X(8) in order in the first direction Dx.

The Y-coordinates of the 8×8 individual detection regions 4 are denoted by Y(1), Y(2), . . . , and Y(8) in order in the second direction Dy.

The gate line 11 is an electrical wiring line extending in the first direction Dx. The gate line 11 is coupled to the gates (gate metals 36) of the respective switching elements Tr arrayed in the first direction Dx. In other words, the switching elements Tr arrayed in the first direction Dx share one gate line 11. The gate lines 11 are arrayed in the second direction Dy and are provided at respective Y-coordinates one by one.

The gate link line 12 is an electrical wiring line extending from the gate line drive circuit 8 in the second direction Dy. The gate link line 12 intersects the gate lines 11 in areas overlapping the respective detection electrodes 52 in plan view. The gate link lines 12 are arrayed in the first direction Dx and are provided at respective X-coordinates one by one. The gate link line 12 is coupled to the gate line 11 via a contact CP.

The contact CP is provided in the individual detection region 4 at the coordinates satisfying (X,Y)=(q,q) out of the individual detection regions 4. In other words, the contacts CP are arrayed in an oblique direction with respect to the first direction Dx and the second direction Dy. Specifically, a contact CP(1), for example, is provided in the individual detection region 4 at the coordinates satisfying (X,Y)=(1,1). The contact CP(1) couples the gate link line 12(1) at the X-coordinate (1) and the gate line 11(1) at the Y-coordinate (1). With this configuration, a signal from the gate line drive circuit 8 is input to the gate line 11(1) via the gate link line 12(1) and the contact CP(1).

The signal line 13 is an electrical wiring line extending from the signal line selection circuit 9 in the second direction Dy. Therefore, the signal line 13 is parallel to the gate link line 12. The signal line 13 is coupled to the drains (drain metals 39) of the respective switching elements Tr arrayed in the second direction Dy. In other words, the switching elements Tr arrayed in the second direction Dy share one signal line 13. A plurality of signal lines 13 are arrayed in the first direction Dx and are provided at respective Y-coordinates one by one.

As illustrated in FIG. 1, the coupler 7, the gate line drive circuit 8, and the signal line selection circuit 9 are disposed in the peripheral region 3. The coupler 7 is coupled to a drive integrated circuit (IC) disposed outside the touch panel 1. The drive IC may be mounted as a chip on film (COF) on a flexible printed circuit board or a rigid board coupled to the coupler 7. Alternatively, the drive IC may be mounted as a chip on glass (COG) on the peripheral region 3.

The peripheral region 3 has a frame shape and has four sides. The coupler 7, the gate line drive circuit 8, and the signal line selection circuit 9 are collectively disposed on one of the four sides of the peripheral region 3. Specifically, the coupler 7, the gate line drive circuit 8, and the signal line selection circuit 9 according to the present embodiment are collectively disposed on one side in the second direction Dy with respect to the detection region 2. When the touch panel 1 is stretched in the second direction Dy (refer to arrow A1 in FIG. 1), no load acts on the coupler 7, the gate line drive circuit 8, or the signal line selection circuit 9. In other words, this configuration improves the stretchability (ease of stretching) of the touch panel 1 in the second direction Dy.

The gate line drive circuit 8 is a circuit that drives a plurality of gate lines 11 (refer to FIG. 4) based on various control signals supplied from the drive IC. The gate line drive circuit 8 simultaneously or sequentially selects the gate link lines 12 (gate lines 11) and supplies gate drive signals to the selected gate lines 11. The signal line selection circuit 9 is a switch circuit that simultaneously or sequentially selects the signal lines 13. The signal line selection circuit 9 couples the selected signal line 13 to the drive IC based on selection signals supplied from the drive IC.

The method for detecting whether a touch operation is performed is as follows: the gate line drive circuit 8 transmits the gate drive signals to all the switching elements Tr via the gate lines 11 and the gate link lines 12 to open the gates of the switching elements Tr. At the same time, the signal line selection circuit 9 transmits AC square waves Sg to the switching elements Tr via the signal lines 13. As a result, the AC square waves Sg are transmitted to the detection electrodes 52 via the switching elements Tr. Capacitance corresponding to whether a touch operation is performed is accumulated in the detection electrodes 52. After the AC square waves Sg are transmitted, the gate line drive circuit 8 temporarily stops supplying the gate drive signals so as to hold the capacitance accumulated in the detection electrodes 52.

Subsequently, the gate drive signal is transmitted to the gate link line 12(1) at the X-coordinate (1), for example, out of the gate link lines 12. This opens the gates of the respective switching elements Tr coupled to the gate line 11(1) at the Y-coordinate (1). The signal line selection circuit 9 sequentially selects the signal lines 13 coupled to the drive IC, thereby causing the detection electrodes 52 to output an electric current corresponding to the capacitance. As a result, it is detected whether a touch operation is performed in each of the individual detection regions 4 disposed at the Y-coordinate (1).

After the detection in each of the individual detection regions 4 disposed at the Y-coordinate (1) is completed, the gate drive signal is transmitted to the gate link line 12(2) at the X-coordinate (2) to sequentially change the Y-coordinate to be subjected to detection of a touch operation. By repeating this method, it can be detected whether a touch operation is performed in the entire detection region 2. The following describes the structure of the touch panel 1 in greater detail.

Figure 5:
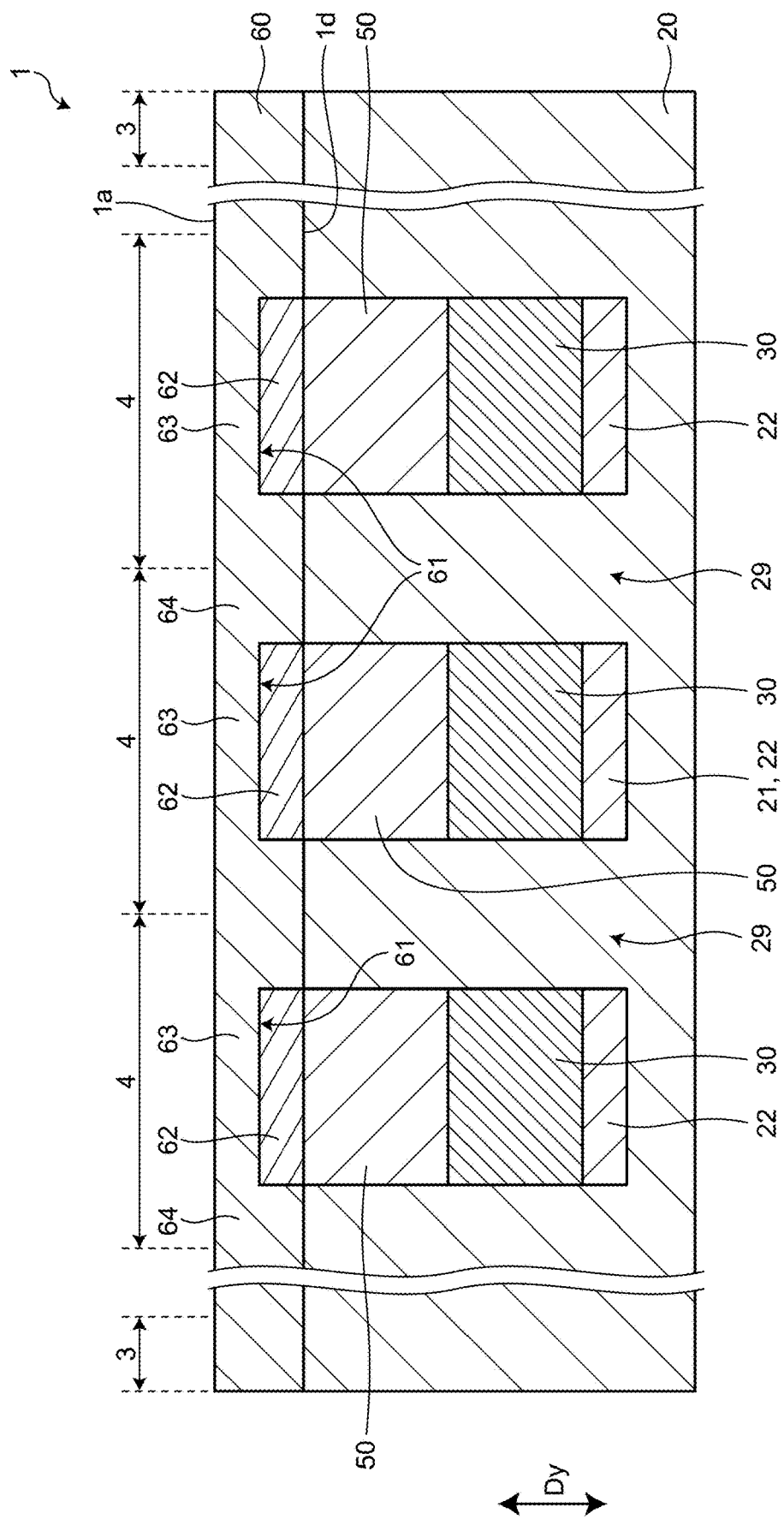
FIG. 5 is a sectional view of the touch panel according to the first embodiment cut in a third direction, and more specifically is a schematic of a section along line V-V of FIG. 6.
Figure 6:
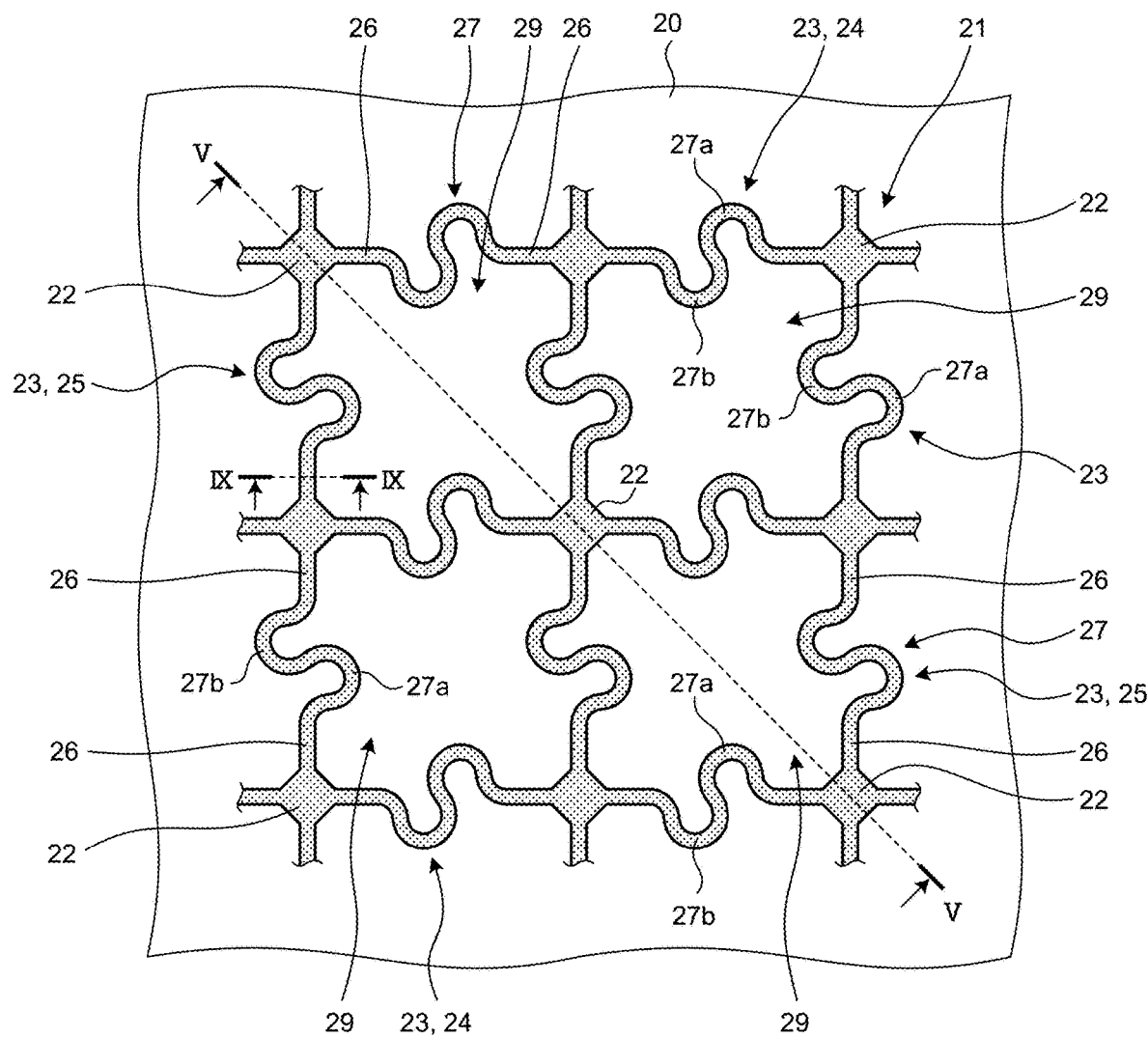
FIG. 6 is an enlarged plan view of part of a resin base member disposed in a detection region.

FIG. 5 is a sectional view of the touch panel according to the first embodiment cut in the third direction, and more specifically is a schematic of a section along line V-V of FIG. 6. As illustrated in FIG. 5, the touch panel 1 includes a first resin plate 20, a resin base member 21, an array layer 30, a functional layer 50, and a second resin plate 60. The structure composed of the resin base member 21 and the array layer 30 corresponds to a stretchable array substrate. In the touch panel 1 according to the present embodiment, the functional layer 50 includes the detection electrodes 52.

In the following description, upward and the upper side refer to one direction along the third direction Dz and correspond to a direction from the first resin plate 20 to the resin base member 21. Downward and the lower side refers to the other direction along the third direction Dz opposite to the one direction and correspond to a direction from the resin base member 21 to the first resin plate 20. In addition, the view from the upper side may be referred to as plan view.

The first resin plate 20 and the second resin plate 60 are made of resin material and have elasticity and flexibility. While examples of the resin material include acrylic resin, epoxy resin, and urethane resin, the present disclosure is not limited thereto. The first resin plate is a base member of the touch panel 1. The first resin plate 20 and the second resin plate 60 have a rectangular shape in plan view. The first resin plate 20 and the second resin plate 60 sandwich the resin base member 21, the array layer 30, and the functional layer 50.

The second resin plate 60 has the detection surface 1a facing opposite to the functional layer 50 and a facing surface 1d facing the functional layer 50 (detection electrode 52). The detection surface 1a and the facing surface 1d have a planar shape. The facing surface 1d has a plurality of recessed surfaces 61 recessed toward the detection surface 1a. The recessed surface 61 is provided with a high permittivity layer 62. The high permittivity layer 62 is made of high permittivity material with a permittivity ε of approximately 10. The permittivity ε of the second resin plate 60 is as follows: when using acrylic resin, the permittivity ε ranges from 2 to 3, when using epoxy resin, the permittivity ε ranges from 2 to 6, and when using urethane resin, the permittivity ε ranges from 6 to 7. Therefore, the high permittivity layer 62 has higher permittivity ε than the resin material of the second resin plate 60 does.

The high permittivity layer 62 according to the present disclosure simply needs to have the permittivity c higher than that of the second resin plate 60 and is not necessarily made of material with a permittivity ε of approximately 10. The high permittivity layer 62 may be made of material other than resin material. The recessed surfaces 61 are formed by ashing, for example. In ashing, a resist film with openings is formed on the facing surface 1d, and the facing surface 1d is irradiated with plasma. As a result, part of the second resin plate is removed from the openings, thereby forming the recessed surfaces 61. Subsequently, high permittivity material is deposited on the recessed surfaces 61 by ink-jetting, thereby forming the high permittivity layer 62. In the following description, the portion of the second resin plate 60 provided with the recessed surface 61 and having a smaller thickness in the third direction Dz is referred to as a thin film portion 63. The portion of the second resin plate 60 not provided with the recessed surface 61 and has a normal thickness is referred to as a normal film thickness portion 64.

The resin base member 21 is provided on the upper surface of the first resin plate 20. The resin base member 21 has elastic, flexible, and insulating properties. The resin base member 21 is made of resin material, such as polyimide.

FIG. 6 is an enlarged plan view of part of the resin base member disposed in the detection region. As illustrated in FIG. 6, the resin base member 21 includes bodies 22 and hinges 23. The bodies 22 are disposed apart from each other in the first direction Dx and the second direction Dy. The hinges 23 couple the bodies 22. The hinges 23 include first hinges 24 and second hinges 25. The first hinge 24 extends in the first direction Dx. The second hinge 25 extends in the second direction Dy.

The switching element Tr is stacked on the body 22, and the detection electrode 52 is stacked on the switching element Tr (refer to FIG. 7). The body 22 has a rectangular shape in plan view and has four corners. The body 22 is disposed such that each of the four corners faces the first direction Dx or the second direction Dy. Each of the corners of the body 22 is joined (coupled) to the hinge 23.

Electrical wiring lines are stacked on the hinge 23. Specifically, the gate line 11 is stacked on the first hinges 24. The gate link line 12 and the signal line 13 are stacked on the second hinges 25. When the first hinge 24 is rotated by 90 degrees, it has the same shape as that of the second hinge 25. The following describes the shape of the hinge 23 using the first hinge 24 as an example.

The first hinge 24 has two linear portions 26 linearly extending in the first direction Dx and a bend 27 meandering when viewed in the stacking direction. The two linear portions 26 are disposed apart from each other in the first direction Dx. One end of the linear portion 26 is coupled to a corner of the body 22. In other words, the linear portion 26 extends from the body 22.

The bend 27 has a first arc 27a and a second arc 27b. The first arc 27a protrudes toward one side in the second direction Dy. The second arc 27b protrudes toward the other side in the second direction Dy. When a stretching load in the first direction Dx acts on the first hinge 24, for example, the first arc 27a and the second arc 27b deform to expand in diameter.

The resin base member 21 has a plurality of hollow portions 29 each surrounded by four hinges 23 disposed in a frame shape. The hollow portion 29 is a hole passing through the resin base member 21.

As illustrated in FIG. 5, neither the array layer 30 nor the functional layer 50 is stacked on the hollow portion 29. The hollow portion 29 is filled with the first resin plate 20 instead. With this configuration, the touch panel 1 has low rigidity in the area overlapping the hollow portion 29 and has elasticity (stretchability). When the touch panel 1 expands or contracts, the hinges 23 expand or contract, thereby reducing the amount of expansion or contraction of the bodies 22. This mechanism reduces damage to functional elements (electrodes 52 according to the present embodiment). While the hollow portion 29 according to the present embodiment is filled with the first resin plate 20, it may be filled with the second resin plate 60 or both the first resin plate 20 and the second resin plate 60. The following describes the array layer 30, the functional layer 50, and the second resin plate 60 stacked on the body 22.

FIG. 7 is a sectional view of the body according to the first embodiment cut in the stacking direction. As illustrated in FIG. 7, the array layer 30 stacked on the body 22 includes an undercoat layer 31, a light-blocking metal 32, an undercoat layer 33, a semiconductor 34, a gate insulating film 35, the gate metals 36, an insulating film 37, a metal layer (the source metal 38 and the drain metal 39), and an insulating film 40. The functional layer 50 stacked on the body 22 includes a planarization film 51, the detection electrode 52, and an insulating film 53. The undercoat layers 31 and 33, the gate insulating film 35, the insulating film 37, the planarization film 51, and the insulating film 53 have insulating properties. The switching element Tr is a multi-gate system with two gate metals 36.

The undercoat layers 31 and 33 are coating layers made of an epoxy resin composition, for example, and may be inorganic films. The gate insulating film 35 and the insulating film 37 are insulating layers made of nitride, such as silicon nitride. The planarization film 51 is an organic planarization film made of any one of acrylic, polyimide, and polyacrylamide, for example.

The light-blocking metal 32 is disposed closer to the resin base member 21 with respect to the semiconductor 34. The light-blocking metal 32 is a layer for preventing light incident on the first resin plate 20 from reaching the semiconductor 34.

Figure 8:
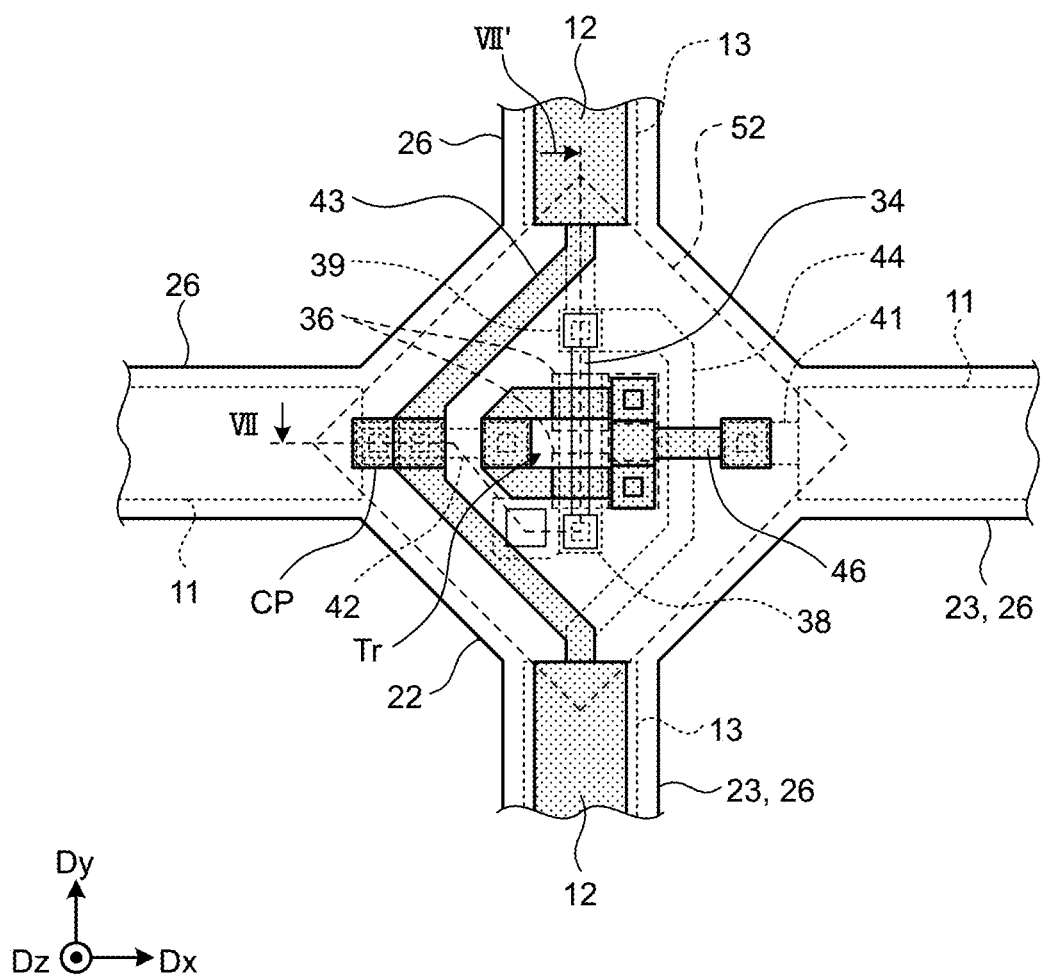
FIG. 8 is a plan view of an array layer and a functional layer stacked on the body.

FIG. 8 is a plan view of the array layer and the functional layer stacked on the body. In FIG. 8, the source (source metal 38) and the drain (drain metal 39) of the switching element Tr overlap the semiconductor 34 and the switching element Tr. As illustrated in FIG. 7, the semiconductor 34 is coupled to the source metal 38 and the drain metal 39. The two gate metals 36 are disposed between the source metal 38 and the drain metal 39 and serve as the gate of the semiconductor 34. The gate insulating film 35 is interposed between the semiconductor 34 and the gate metals 36.

The detection electrode 52 is made of light-transmitting conductive material, such as indium tin oxide (ITO). The detection electrode 52 is coupled to the source (source metal 38) of the switching element Tr.

The thin film portion 63 of the second resin plate 60 is stacked on the detection electrode 52. In other words, the recessed surface 61, the thin film portion 63, the detection electrode 52, and the body 22 overlap when viewed in the stacking direction. A thickness of the thin film portion 63 needs to be at least 5 µm or larger from the viewpoint of rigidity and strength.

The contact CP is provided in the array layer 30 of the individual detection region 4 at the coordinates satisfying (X,Y)=(q,q). The following describes the layout in plan view of the array layer 30 and the functional layer 50 stacked on the body 22.

As illustrated in FIG. 8, the switching element Tr is disposed at the center of the body 22. The two gate metals 36 are separated in the second direction Dy. The array layer 30 is provided with a first bypass line 43. The first bypass line 43 is a C-shaped wiring line in plan view and extends in the second direction Dy while bypassing the switching element Tr.

The gate link line 12 disposed on one side (lower side in FIG. 8) in the second direction Dy with respect to the body 22 is coupled to one end (lower end in FIG. 8) of the first bypass line 43 in the second direction Dy. The gate link line 12 disposed on the other side (upper side in FIG. 8) in the second direction Dy with respect to the body 22 is coupled to the other end (upper end in FIG. 8) of the first bypass line 43 in the second direction Dy. As a result, the gate link lines 12 stacked at the respective hinges 23 (second hinges 25) are continuously coupled in the second direction Dy.

As illustrated in FIG. 7, the gate line 11 disposed on one side (left side in FIG. 8) in the first direction Dx with respect to the body 22 is coupled to the contact CP through a contact hole. The contact CP is provided in the same layer as that of the first bypass line 43 and is coupled to the first bypass line 43. Therefore, the gate line 11 disposed on one side (left side in FIG. 8) in the first direction Dx with respect to the body 22 is coupled to the gate link line 12. The first bypass line 43 is coupled to a link line 42 in a lower layer through a contact hole.

As illustrated in FIG. 8, the link line 42 extends in the first direction Dx. The other end (right end in FIG. 8) of the link line 42 in the first direction Dx is coupled to a second bypass line 46 through a contact hole. The second bypass line 46 (refer to the area indicated by dots in FIG. 8) extends in the first direction Dx at the center of the body 22. The second bypass wiring 46 is branched out into two in the second direction Dy at the center in the first direction Dx and overlaps the two gate metals 36 in plan view. The second bypass line 46 is coupled to the two gate metals 36 through contact holes.

The other end (right end in FIG. 8) of the second bypass line 46 in the first direction Dx is coupled to a link line 41 through a contact hole. The link line 41 is coupled to the gate line 11 disposed on the other side (right side in FIG. 8) in the first direction Dx with respect to the body 22. Therefore, the gate lines 11 stacked at the respective hinges 23 (first hinges 24) are continuously coupled in the first direction Dx.

The semiconductor 34 extends in the second direction Dy under the two gate metals 36. One end (lower end in FIG. 8)

of the semiconductor 34 in the second direction Dy is coupled to the detection electrode 52 via the source metal 38.

The other end (upper end in FIG. 8) of the semiconductor 34 in the second direction Dy is coupled to the drain metal 39. The drain metal 39 is coupled to a third bypass line 44. The third bypass line 44 is a C-shaped wiring line in plan view and extends around the switching element Tr. One end (lower end in FIG. 8) of the third bypass line 44 in the second direction Dy is coupled to the signal line 13 disposed on one side (lower side in FIG. 8) in the second direction Dy with respect to the body 22. By contrast, the other end (upper side in FIG. 8) of the third bypass line 44 in the second direction Dy is coupled to the signal line 13 disposed on the other side (upper side in FIG. 8) in the second direction Dy with respect to the body 22. Therefore, the signal lines 13 stacked at the respective hinges 23 (second hinges 25) are continuously coupled in the second direction Dy by the third bypass line 44.

Figure 9:
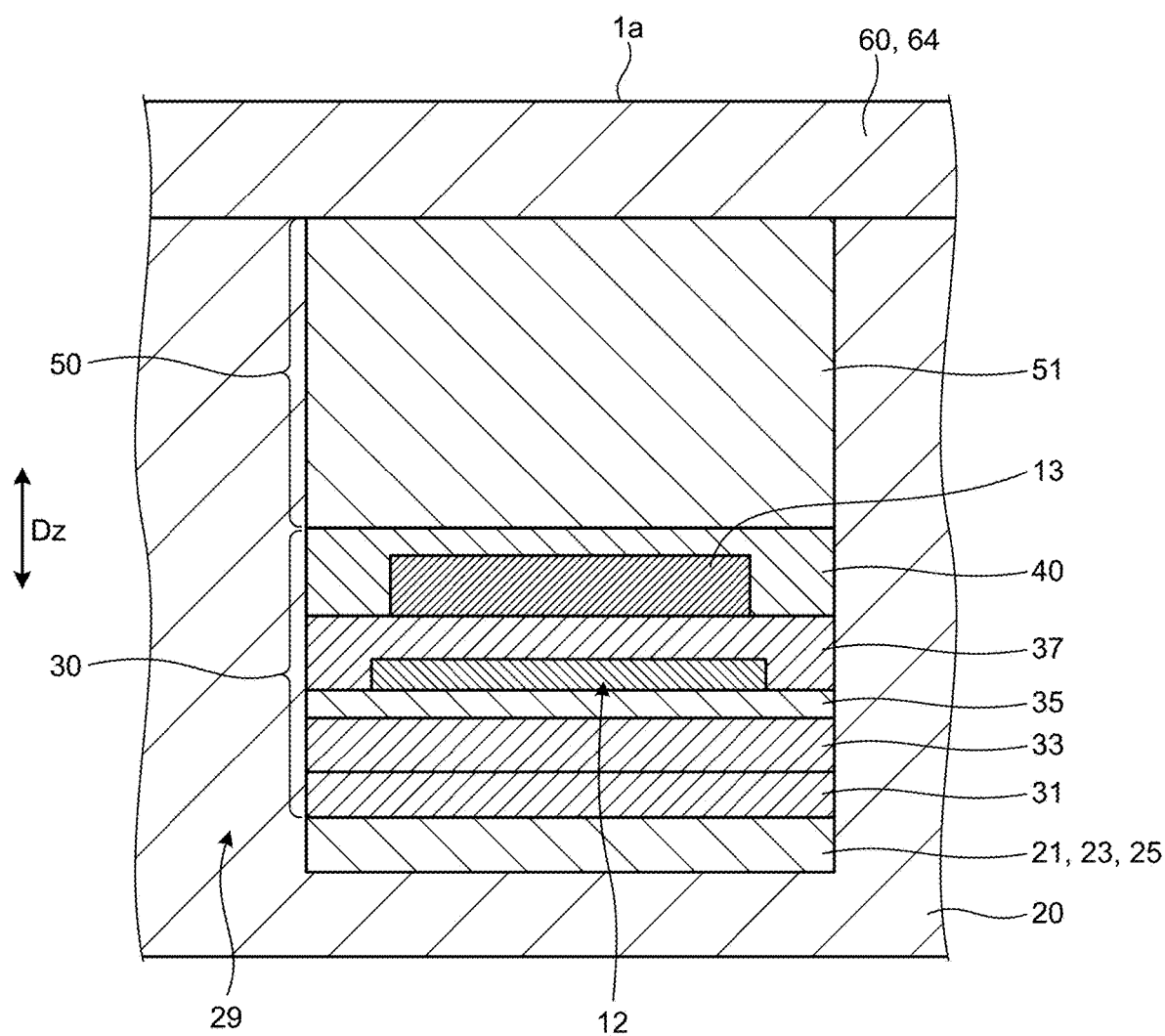
FIG. 9 is a sectional view of a second hinge according to the first embodiment cut in the stacking direction, and more specifically is a sectional view seen in the arrow direction along line IX-IX of FIG. 6.

The following describes the multilayered structure of the hinge. FIG. 9 is a sectional view of the second hinge according to the first embodiment cut in the stacking direction, and more specifically is a sectional view seen in the arrow direction along line IX-IX of FIG. 6. As illustrated in FIG. 9, the array layer 30 stacked on the second hinge 25 includes the undercoat layer 31, the undercoat layer 33, the semiconductor 34, the gate link line 12, the insulating film 37, the signal line 13, and the insulating film 40. The functional layer 50 stacked on the second hinge 25 is composed of the planarization film 51 alone.

The array layer 30 stacked on the first hinge 24 includes the undercoat layer 31, the undercoat layer 33, the semiconductor 34, the gate line 11, the insulating film 37, the insulating film 40, and the planarization film 51, which are not specifically illustrated. The gate line 11, the gate link line 12, and the signal line 13 are made of tantalum (Ta).

The second resin plate 60 stacked on the hinge 23 is the normal film thickness portion 64. Therefore, the resin plate thicker than the thin film portion 63 is stacked.

The following describes the advantageous effects of the touch panel 1 according to the first embodiment. Expression (1) indicates the detection sensitivity in the touch panel 1 according to the first embodiment.

$$C_f = \frac{\varepsilon_0 \varepsilon_\gamma A}{d} \quad (1)$$

$C_f$ in Expression (1) is the capacitance generated between the finger and the detection electrode. $\varepsilon_0$ is the permittivity of vacuum and is a constant. $\varepsilon_\gamma$ is the permittivity of the dielectric. A is the effective area of the detection electrode. d is the distance between electrodes. The distance d between electrodes is the distance from the detection electrode to the detection surface 1a.

The touch panel 1 according to the first embodiment includes the high permittivity layer 62 and the thin film portions 63. The permittivity $\varepsilon_\gamma$ of the high permittivity layer 62 is high. The touch panel 1 also has the recessed surfaces 61. If the high permittivity layer 62 is provided, this configuration prevents the distance d between electrodes from being increased. Therefore, the value of the capacitance $C_f$ obtained when a touch operation is performed increases, thereby improving the detection sensitivity. In the second resin plate 60, the normal film thickness portions 64 are provided in the regions not overlapping the detection electrodes. This configuration secures the rigidity and the strength required for the second resin plate 60, thereby preventing reduction in durability of the touch panel 1.

While the first embodiment has been described above, the present disclosure is not limited thereto. While the recessed surfaces 61 are provided on the facing surface 1d, for example, they may be provided on the detection surface 1a. In other words, the high permittivity layer 62 may be exposed on the detection surface 1a.

What is claimed is:

1. A touch panel comprising, in sequence:
   a stretchable array substrate,
   a touch detection electrode; and
   a resin plate, wherein
   the stretchable array substrate includes: a switching element having a source coupled to the touch detection electrode; a gate line coupled to a gate of the switching element; and a signal line coupled to a drain of the switching element,
   the resin plate has:
   a facing surface facing the touch detection electrode; and
   a detection surface facing opposite to the facing surface,
   the facing surface or the detection surface has a recessed surface,
   the recessed surface is provided with a high permittivity layer having permittivity higher than permittivity of the resin plate, and
   when viewed in a stacking direction in which the stretchable array substrate, the touch detection electrode, and the resin plate are stacked, the high permittivity layer overlaps the touch detection electrode that is coupled to the source of the switching element.

2. The touch panel according to claim 1, wherein
   the stretchable array substrate comprises a resin base member,
   the resin base member comprises:
   a plurality of bodies disposed apart from each other; and
   a plurality of hinges that couple the bodies, and
   the touch detection electrode and the high permittivity layer overlap a corresponding one of the bodies when viewed in the stacking direction.

3. The touch panel according to claim 2, wherein the recessed surface is provided to the facing surface.

4. The touch panel according to claim 1, wherein the recessed surface is provided to the facing surface.

* * * * *